I. W. NONNEMAN.
PIPE CUTTER.
APPLICATION FILED FEB. 10, 1914.
1,150,220.
Patented Aug. 17, 1915.
2 SHEETS—SHEET 1.
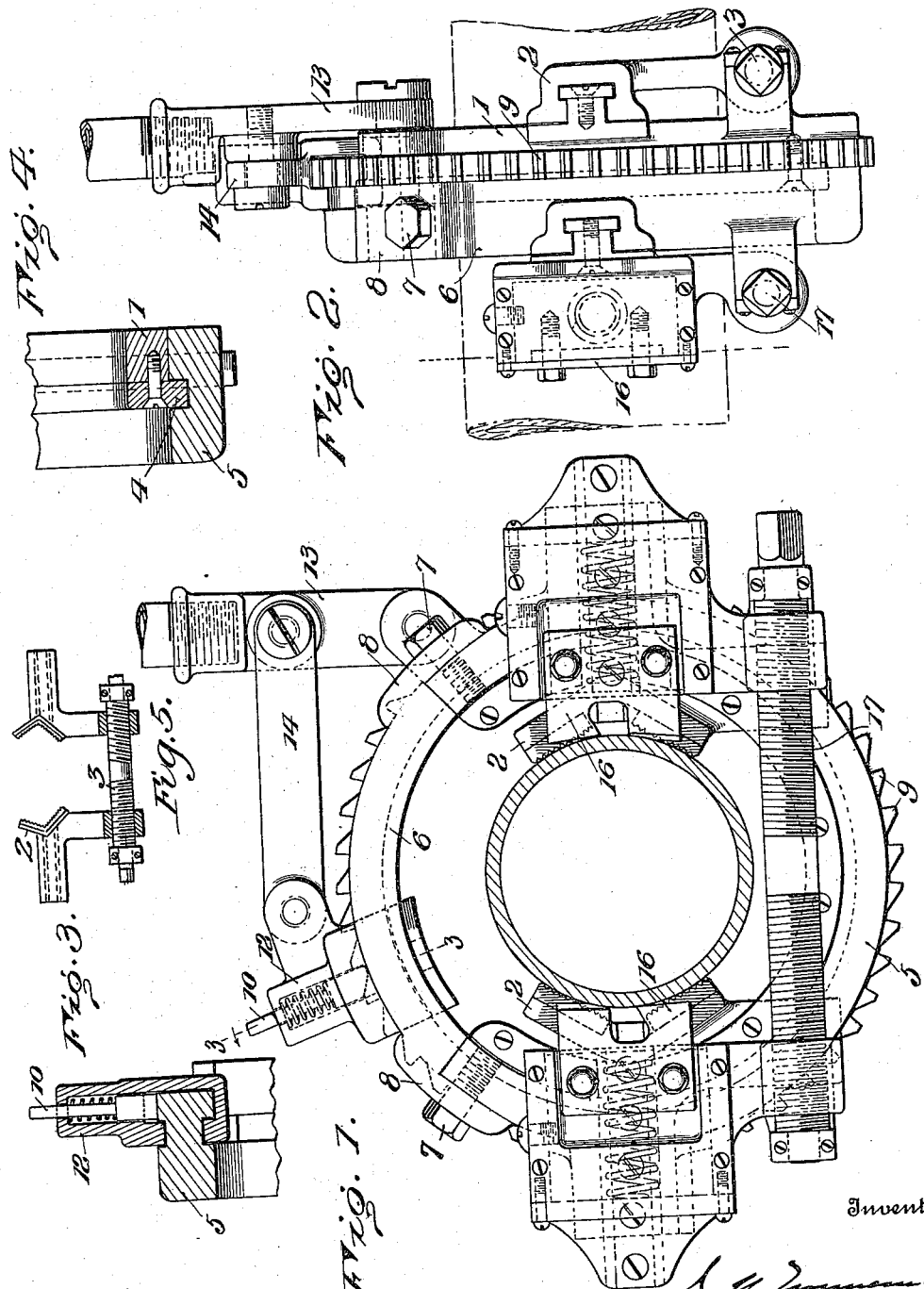

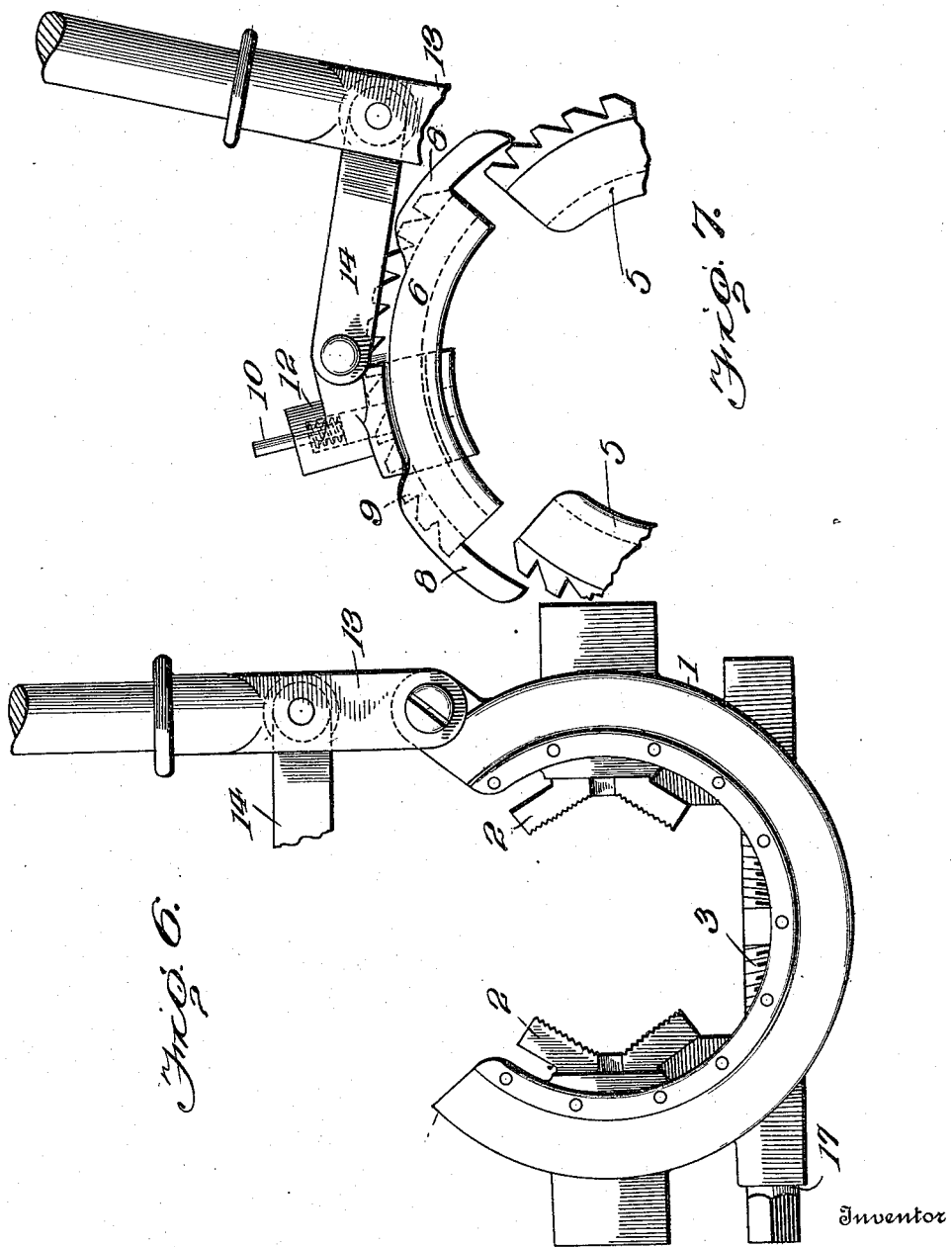

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

PIPE-CUTTER.

1,150,220.

Specification of Letters Patent.

Patented Aug. 17, 1915.

Application filed February 10, 1914. Serial No. 817,896.

*To all whom it may concern:*

Be it known that I, IRA W. NONNEMAN, of Warren, in the county of Trumbull and State of Ohio, have invented certain new and useful Improvements in Pipe-Cutters; and I do hereby declare the following to be a full, clear, and exact description of the invention, such as will enable others skilled in the art to which it appertains to make and use the same.

The object of this invention is to provide a strong and simple pipe-cutter for pipes of relatively large diameter; one which may be easily applied to a pipe between its ends, and one which may be easily manipulated without danger of burning off the corners of the knives.

In the accompanying drawing, Figure 1 is a front elevation with parts in dotted lines. Fig. 2 is a side view. Fig. 3 is a sectional view on line 3—3 Fig. 1. Fig. 4 is a sectional view through a portion of the chuck and cutter-carrier. Fig. 5 is a fragmentary view showing the means for adjusting the chuck jaws. Fig. 6 is a view of the chuck-ring and a portion of the operating handle. Fig. 7 is a view of a portion of the cutter carrier and its removable segment, together with a portion of the operating lever.

The pipe-cutter shown in the Howe Patent No. 1,040,202 of October 1, 1912, while most effective for cutting pipe of relatively small diameters, is open to the objection, in cutting pipe of relatively large diameters, say four inches and over, that the corners of the knives will burn off. This is owing to the fact that the direct pull exerted on the tool causes the cutters to travel at a rapid rate. By my present invention the advantage of the automatic feed of the cutters is retained, but the cutters are caused to rotate at a relatively slow speed, and furthermore the tool may be applied to a pipe at any point.

Referring to the drawings, 1 designates a chuck which is shown in the form of a segmental ring and as having two diametrically-opposed pipe-engaging jaws 2 which are capable of being moved in opposite directions by turning a double-threaded screw 3. The omitted segment leaves an opening in the chuck-ring to permit the latter to be moved laterally onto pipes of different diameters within the range of the tool. To the front face of this ring is secured a segmental gib 4 the periphery of which projects beyond the periphery of such ring.

5 is the cutter-carrier which is shown in the form of a ring revolubly mounted on the chuck and extending beyond one side thereof. The cutter-ring on its inner face has a continuous groove for taking in gib 4 by which it is retained in position on the chuck. A segment 6 of the cutter-ring is removable, but is normally held in place by bolts 7 which are passed through the deflected flanged ends 8 of the segment, which ends overlap the outer face of ring 5 sufficiently to insure a firm bearing for the segment when in place. The segment 6 corresponds in length to the interruption in the chuck-ring. The periphery of the cutter-ring is provided with ratchet teeth 9, said teeth being formed also on the segment 6. These teeth are engaged by a spring-pressed pawl 10 whose carrier 12, slidably mounted on the cutter-ring, is given the necessary back and forth movement by the reciprocation of a manipulating lever 13 which is fulcrumed on the chuck-ring and is connected by a link 14 to the pawl-carrier. The point of fulcrum of lever 13 is to one side of a vertical plane passing centrally through the axis of the cutter-carrying ring, and is preferably somewhat nearer the horizontal plane passing centrally through such axis than it is to the vertical plane. The link 14 is extended at substantially right angles from the lever to which it is connected at a point near the fulcrum, making an angle more acute than that of a tangent to a radius of the cutter-carrying ring, thereby insuring easy action and requiring less space for the manipulation of the lever. As the pawl-carrier is moved in one direction the cutter-ring is caused to move therewith, but when moved in the opposite direction the pawl slides over the ratchet teeth. In this way the cutter-carrier is gradually rotated.

In suitable housings 15 on the projecting portion of the cutter-ring are mounted spring-pressed knives or cutters 16, which are preferably constructed and arranged after the manner of the Howe patent before noted. By turning a double threaded screw 17 mounted in bearings on the cutter-carrier, the housing of the two cutters will move in unison, and when forced into engagement with a pipe the respective springs of the cutters will be placed under sufficient tension to insure their being kept to their work as the cutting operation progresses.

To apply the device to a pipe at a point other than over the end thereof, the operator turns the cutter-carrying ring by manipulating the lever, until about the center of the removable segment 6 is in engagement with the pawl, at which time such segment is in line with the omitted portion of the chuck ring, and thereupon by withdrawing bolts 7, the segment 6 may be swung clear of the passageway provided for a pipe, such segment, the pawl-carrier and link 14 being moved out of the way by the operator turning lever 13 on its fulcrum. Thereupon screw 3 is turned to bind the clamps 2 against the pipe, and segment 6 is restored to its proper position where it is held by bolts 7. Then by turning screw 17 the two cutters will be brought into engagement with the pipe and their respective springs compressed. The cutter-carrier is gradually revolved around the pipe and the chuck by the back and forth movements of the manipulating lever.

The advantages of my invention will be readily appreciated by those skilled in the art. It will be seen that by means thereof a pipe-cutter having automatically controlled knives may be employed for cutting pipes of relatively large diameters without danger of burning off the corners of the knives; that the tool may be readily applied to a pipe either over its end or by positioning it thereon at any intermediate point, and that when the parts are removed from their normal positions, with the single exception of the bolts by which the cutter-ring segment is held, all the parts so removed are carried by the manipulating lever, thus lessening the danger of their being lost or misplaced. By means of the lever fulcrumed on the chuck and connected to the pawl the cutter-carrier may be gradually rotated without danger of unduly injuring the cutters.

I claim as my invention:

1. A pipe-cutter comprising a chuck, a toothed ring rotatably mounted on said chuck and having a removable segment, cutters mounted on said toothed ring, and means mounted on the chuck and designed to engage the toothed portion of said ring for rotating the same, said means being constructed and arranged to support said segment when disconnected from said ring.

2. A pipe-cutter comprising a chuck, a toothed ring rotatably mounted on said chuck and having a removable segment, cutters mounted on said toothed ring, a lever fulcrumed on the chuck to one side of a vertical plane passing centrally through the axis of the cutter-carrying ring; a pawl, a carrier therefor slidably mounted on said ring, and a link connecting said pawl-carrier to said lever, said link being connected to the lever at a point near its fulcrum.

3. A pipe-cutter comprising a chuck, a cutter-carrier rotatably mounted on said chuck, said cutter-carrier being provided with teeth on its periphery and having a removable segment, pipe-cutters mounted on the cutter-carrier, a pawl for engaging the teeth on said cutter-carrier, a carrier for said pawl slidable on said cutter-carrier, and a lever for actuating said pawl-carrier, said pawl-carrier being designed to support said removable segment when the latter is detached.

4. A pipe-cutter comprising a chuck having a ring with a segment thereof omitted and clamps carried by said ring for engaging a pipe, a toothed-ring rotatably mounted on said chuck and having a removable segment provided with deflected flanges at its ends, removable bolts for fastening said flanges to said toothed-ring, cutters mounted on the latter, and means for operating said toothed-ring comprising a reciprocating member and a lever fulcrumed on said chuck and to which said member is pivotally connected.

5. A pipe-cutter comprising a chuck-ring formed with an opening and clamps carried by said ring for engaging a pipe, a cutter-carrying ring rotatably mounted on said chuck-ring and having a removable segment, spring-pressed cutters mounted on said cutter-carrying ring, a screw for operating both cutters simultaneously, the springs of said cutters being placed under tension by the engagement of the cutters with a pipe, a reciprocating lever mounted on said chuck-ring, and means actuated by said lever for rotating said cutter-carrying ring.

6. A pipe-cutter comprising a chuck-ring designed to be secured to a pipe, a cutter-carrying ring rotatably mounted on the chuck-ring and extending beyond one side thereof, spring-pressed cutters, housings for said cutters slidably mounted on said cutter-carrying ring, means for simultaneously adjusting both cutter housings, and means mounted on the chuck-ring for gradually rotating said cutter-carrying ring.

7. A pipe-cutter comprising a chuck-ring having a segment thereof omitted and clamps carried by said ring for engaging a pipe, means for simultaneously adjusting the relative positions of said clamps, a cutter-carrying ring mounted on said chuck-ring and extending beyond one side thereof, self-feeding cutters mounted on said cutter-carrying ring, means for simultaneously adjusting the relative positions of said cutters, and means mounted on the chuck-ring and engaging the cutter-carrying ring for effecting the rotation thereof.

8. A pipe-cutter comprising a chuck-ring having a segment thereof omitted and clamps carried by said ring for engaging a pipe, a cutter-carrying ring rotatably mounted on said chuck-ring and extending beyond one side thereof, said cutter-carrying ring being provided with teeth on its periphery and having a removable segment substantially corresponding in length to the omitted segment of the chuck-ring, means for detachably securing said segment in place, pipe cutters mounted on the cutter-carrying ring, a pawl for engaging the teeth on said cutter-carrying ring, a carrier for said pawl slidable on said cutter-carrying ring, a lever fulcrumed on said chuck-ring, and a link pivotally connecting said pawl-carrier to said lever, said pawl-carrier being designed to support said removable segment when the latter is detached.

In testimony whereof, I have signed this specification in the presence of two subscribing witnesses.

IRA W. NONNEMAN.

Witnesses:
M. W. BECHTEL,
I. B. TAYLOR.

Copies of this patent may be obtained for five cents each, by addressing the "Commissioner of Patents, Washington, D. C."